(No Model.)
B. L. HUBERT.
SEED EXTRACTING MACHINE.
No. 469,026. Patented Feb. 16, 1892.
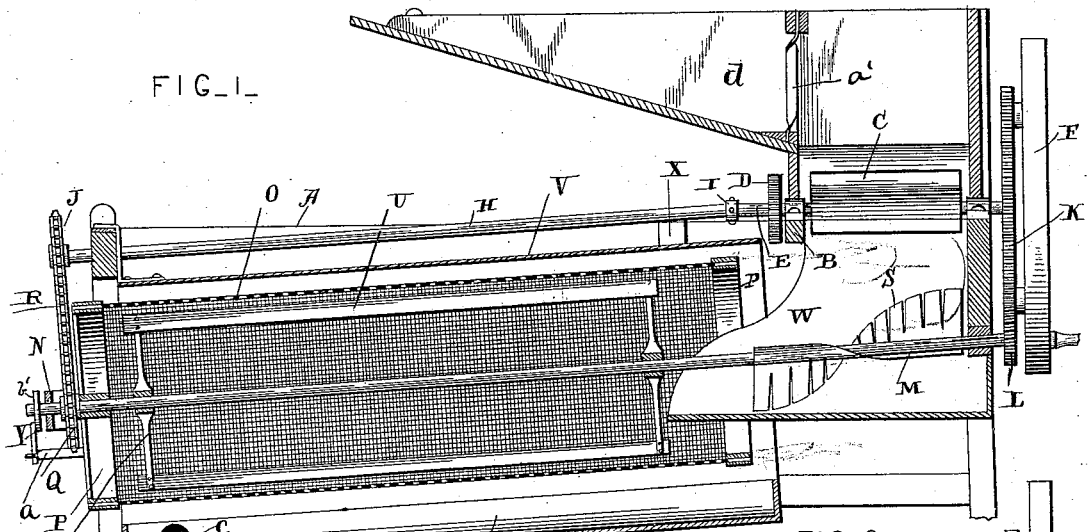
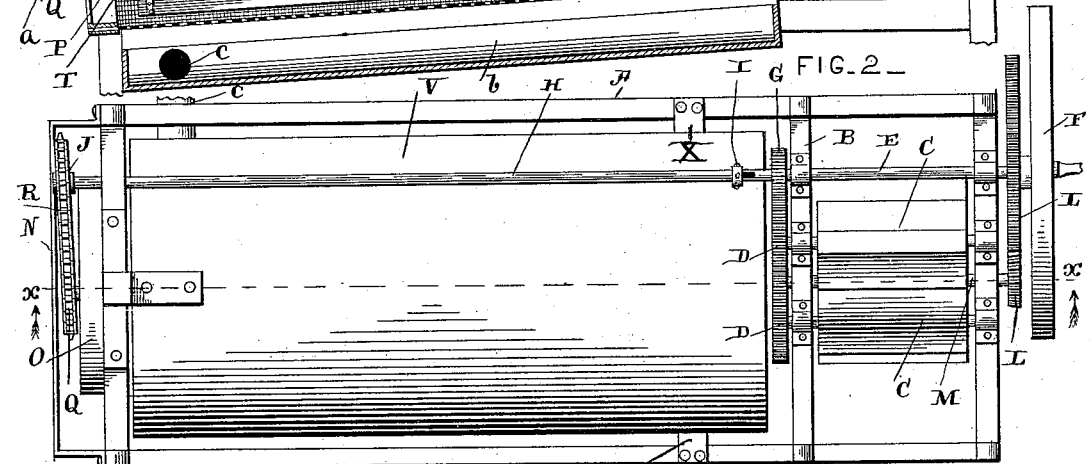
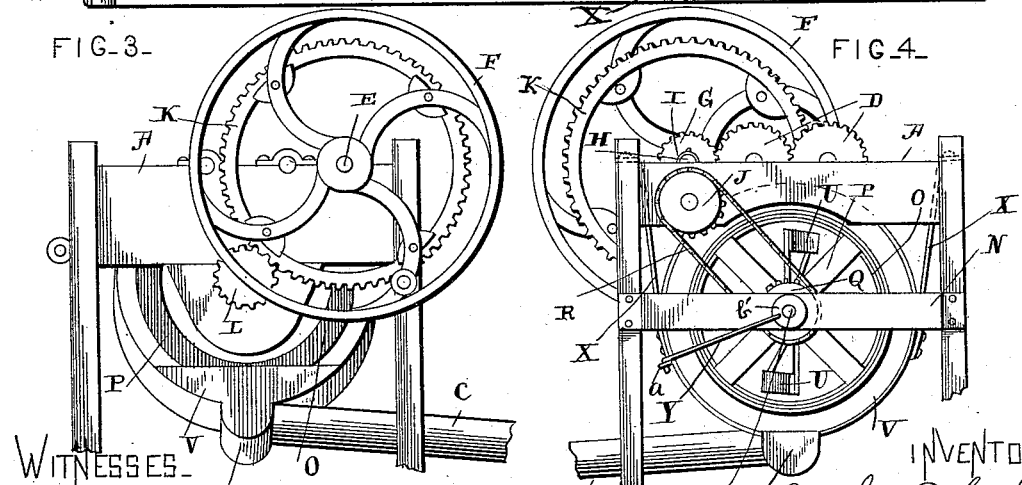
WITNESSES
Geo. E. Frech
Roland H. Fitzgerald
INVENTOR
Bradford L. Hubert
per
Lehmann & Pattison
attys.

UNITED STATES PATENT OFFICE.

BRADFORD L. HUBERT, OF PARMA, MICHIGAN.

SEED-EXTRACTING MACHINE.

SPECIFICATION forming part of Letters Patent No. 469,026, dated February 16, 1892.

Application filed August 19, 1891. Serial No. 403,130. (No model.)

*To all whom it may concern:*

Be it known that I, BRADFORD L. HUBERT, of Parma, in the county of Jackson and State of Michigan, have invented certain new and useful Improvements in Seed-Extracting Machines; and I do hereby declare the following to be a full, clear, and exact description of the invention, such as will enable others skilled in the art to which it pertains to make and use it, reference being had to the accompanying drawings, which form part of this specification.

My invention relates to an improvement in seed-extracting machines; and it consists in the construction and arrangement of parts, which will be fully described hereinafter, and particularly referred to in the claims.

The object of my invention is to extract seed from all vegetables and fruits which have a pulp, and which is so constructed that the fruit or vegetables are fed into a hopper and the machine separates the seeds from the pulp by passing the seed and juice or extract out of a spout together and the pulp and other portions of the vegetables or fruit out at the end of the machine, thus entirely separating the seed for the purpose of planting by simply straining the juice or extract from the seed or washing out in the usual way after they have passed out of the spout of this machine.

In the drawings, Figure 1 is a vertical longitudinal sectional view taken through the center of the machine, looking in the direction indicated by arrow in Fig. 2. Fig. 2 is a plan view of the same, the hopper being removed. Figs. 3 and 4 are front and rear end views of the machine, respectively.

A represents a suitable supporting-frame, upon and in which the operating mechanism is supported. Extending across the upper portion of the frame A, near one end thereof, is a cross-beam B, upon which and the adjacent upper end of the frame are journaled the crushing rolls or cutters C, which are provided on their inner ends with the intermeshing gears D. Also journaled upon this cross-beam B and the adjacent end of the frame A is a shaft E, which extends parallel with the shafts of the crushing-rolls and which is provided with a balance or fly wheel F upon its outer end, and this shaft is either operated by hand or by a belt or other suitable gearing from any proper source. Secured to the inner end of this shaft is a small gear-wheel G, which engages with one of the gear-wheels upon the inner ends of the crushing-roll shafts, and this shaft E extends beyond the gear-wheel G a short distance and has its extremity connected with the inner and adjacent end of a shaft H by means of a universal connection I, as shown. This shaft H extends downward at an angle, as shown, and extends through the opposite end of the frame A from the crushing-rolls and is provided with a sprocket-wheel J. Secured to the outer end of the shaft E, outside of the adjacent end of the frame A, is a large gear-wheel K, which meshes with a small bevel gear-wheel L, that is secured to the extended end of an inclined shaft M. This shaft M extends longitudinally through the center of the machine at a slight inclination, as shown, and has its opposite end journaled in a cross-bar N, which is supported by the vertical standards of that end of the supporting-frame A. Placed concentrically in relation to this shaft and surrounding it is a wire cylinder O, which is provided with the heads P, and these heads are concentrically journaled upon the said shaft M. The outer end of this cylinder is provided with a sprocket-wheel Q, and around this wheel Q and the sprocket-wheel J upon the inclined shaft H passes a chain R, by means of which the cylinder is revolved by the operating-wheel and the intermediate gearing, as will be readily understood.

Secured to the inner end of the shaft M, which passes concentrically through the cylinder O and just under the crushing-rolls, is a conveyer S, which is in the form of a screw, and which has its edge serrated or provided with teeth, as shown, for a purpose to be presently described. Secured to this inclined shaft M, which passes through the cylinder, are the arms T, to which the longitudinal beaters U are secured in any suitable manner between the two heads of the cylinder. By means of this construction when the operating-shaft E is revolved the cylinder and the inclined shaft which carries the conveyer and the beaters are revolved in the opposite direction and the crushing-rolls are also revolved by the same operating-shaft. The beaters U are placed at an angle to the shaft which carries them, which makes a spiral, which gradually carries the pulp as it is beat to the lower end of the cylinder, where it is deposited after the seed are beat out of it.

Inclosing the cylinder O is a casing V, which has open ends, and extending into the inner end of this casing is a trough W. This trough W is placed directly under the crushing-rolls and the disintegrating and feeding conveyer, so that the crushed and disintegrated vegetables or fruit are fed by this trough and the feeding-propeller into the cylinder, as will be seen. The inner end of this casing V is suspended upon suitable suspension rods or bands X, which will allow the outer end of the casing to vibrate.

Secured to the lower end of the shaft M, which extends through the cylinder O outside of the supporting cross-bar N, is a crank or eccentric, and connecting this crank or eccentric $b'$ and a rod or extension $a$, which projects outward from the lower and outer end of the vibrating casing V, is a connecting-rod or pitman Y, by means of which construction the lower end of the casing is vibrated as the shaft M is revolved. The bottom of this casing is provided with a longitudinal trough or groove $b$, which extends from end to end thereof, and this groove or trough has its ends closed, as shown. Extending laterally from the lower end of this trough or groove is an exit-spout $c$ for the extracted seed and juice, while the pulp and other disintegrated portions of the vegetables or fruit pass out the end of the wire cylinder.

Placed over the inner end of the frame A, directly over the crushing-rolls, is a hopper $d$, and this hopper is detachably held in place thereon by suitable means. (Not shown.) This hopper has a pit or box at its outer end over the rolls, and the opposite end of the hopper is made inclined, as shown. Placed vertically in the hopper between the pit and the inclined portion is a series of vertical knives $a'$, through which the large vegetables—such as water-melons and large cucumbers—are forced for the purpose of slicing them before they pass to the crushing-rolls.

The operation of my machine is as follows: The vegetables to be acted upon and from which it is desired to extract the seed are fed to the crushing-rolls through the hopper, and after being crushed by the said rolls fall through upon the disintegrating revolving feeding-conveyer, which, owing to the teeth formed upon its edge, disintegrates them, and, owing to its spiral shape, feeds them through the trough W into the revolving cylinder O. While in this cylinder the pulp is subjected to the beating action of the beater-arms, which entirely disintegrates the pulp and tears it up, so that the seed and the juice pass through the cylinder into the inclosing case and through the groove at its bottom to the exit-spout. Owing to the inclination of the cylinder and the screw principle of the beaters U the pulp is gradually fed to the lower end thereof, and finally passes out at its lower end after the seed have been extracted therefrom.

By means of a machine of this construction I am enabled to rapidly extract seed from all vegetables and fruits which have a plurality of small seed, and pass the seed off in one direction and the pulp and other portions of the vegetables or fruit in another direction, which greatly reduces the cost of extracting seed in the usual manner.

Having thus described my invention, I claim—

1. In a seed-extracting machine, a revolving perforated cylinder, a vibrating inclosing casing which surrounds the said cylinder, crushing-rolls for crushing the said stock, and an operating mechanism, the parts combined substantially as set forth.

2. In a seed-extracting machine, a revolving cylinder provided with perforations, a vibratory inclosing casing therefor, both of which are placed on an incline, the said inclosing casing provided with a longitudinal groove in its bottom which has a closed lower end and an exit-opening in the said groove, crushing-rolls for crushing the stock as it is fed to the cylinder, and an operating mechanism, the parts combined substantially as specified.

3. In a seed-extracting machine, a revolving perforated cylinder, a shaft passing through the said cylinder and upon which the cylinder is journaled, beater-arms upon the said shaft, crushing-rolls for crushing the stock, an inclosing casing for the said cylinder which is supported at its inner end to vibrate at its outer end, a crank or eccentric upon the lower end of the said shaft, and a rod connecting the lower end of the said casing and the said eccentric or crank, and an operating mechanism, the parts combined substantially as specified.

4. In a seed-extracting machine, a shaft having a gear upon one end, a driving-shaft provided with a gear which intermeshes with the said gear upon the shaft, a revolving perforated cylinder, crushing-rolls provided with gears which are driven by the driving-shaft, a gearing connecting the driving-shaft and the said cylinder, an inclosing case for the said cylinder, which is supported at its inner end to vibrate at its outer end, and a means for vibrating the said inclosing case, the parts combined substantially as described.

5. In a seed-extracting machine, a shaft which extends longitudinally of the machine, a perforated cylinder journaled upon the said shaft, an inclosing case for the said cylinder, which is constructed to vibrate at its lower end, a connection between the said shaft and the lower end of the casing for vibrating the latter, beater-arms upon the said shaft within the said cylinder, a screw conveyer or feeder upon the said shaft beyond the inner end of the said cylinder, crushing-rolls for crushing the stock and feeding it to the said feeder, a gear upon the cylinder, a driving-shaft, and intermediate gearing between the shaft which passes through the cylinder, the rolls, the cylinder, and the driving-shaft, whereby they are all driven by the driving-shaft, the parts combined substantially as specified.

6. In a seed-extracting machine, the combination of the inclined rotary cylinder having open ends, a rotary shaft on which the cylinder is loosely mounted, provided with beaters, an exterior casing for the cylinder, provided with an inclined bottom channel having a discharge, agitating mechanism, substantially as described, for said casing, operating mechanism whereby the juice and seeds pass through the perforations into the casing and the pulp is discharged at the lower open end of the cylinder, and means, substantially as shown, for reducing the vegetables and passing them into the upper open end of the cylinder, substantially as specified.

7. In combination, the crushing-rolls, the perforated cylinder having beaters, the screw conveyer beneath said rolls and discharging into said cylinder and having the toothed edges, as described, to disintegrate the crushed vegetables, and driving mechanism, substantially as specified.

8. In combination, a frame, crushing-rolls at one end thereof, a trough beneath said rolls, a shaft extending longitudinally of the frame and carrying a conveyer in said trough, a rotary cylinder loose on the shaft, beaters on the shaft within the cylinder, a drive-shaft extending longitudinally of the frame and geared to rotate said cylinder and rolls, and gearing from said drive-shaft to said beater and conveyer-shaft to rotate the same oppositely to the cylinder, substantially as described.

9. In a seed-extractor, the combination of a shaft carrying beaters, a rotary perforated cylinder loosely mounted on said shaft around the beaters, the exterior vibrating casing for said cylinder, having a bottom channel, and mechanism for driving said shaft and cylinder and for vibrating said casing, substantially as shown and described.

In testimony whereof I affix my signature in presence of two witnesses.

BRADFORD L. HUBERT.

Witnesses;
R. H. DUNBAR,
J. R. GODFREY.